US009742003B2

(12) United States Patent
Paireau et al.

(10) Patent No.: US 9,742,003 B2
(45) Date of Patent: Aug. 22, 2017

(54) METHOD OF PRODUCING A SILICON/CARBON COMPOSITE MATERIAL AND USE OF SUCH A MATERIAL

(75) Inventors: Cyril Paireau, Haute Goulaine (FR); Séverine Jouanneau-Si Larbi, Sillans (FR); François Béguin, Olivet (FR); Encarnacion Raymundo-Pinero, Orléans (FR)

(73) Assignees: COMMISSARIAT À L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITÉ D'ORLÉANS, Orleans (FR)

( * ) Notice: Subject to any disclaimer, the term of this patent is extended or adjusted under 35 U.S.C. 154(b) by 146 days.

(21) Appl. No.: 14/345,586

(22) PCT Filed: Sep. 13, 2012

(86) PCT No.: PCT/FR2012/000365
§ 371 (c)(1),
(2), (4) Date: Mar. 18, 2014

(87) PCT Pub. No.: WO2013/041780
PCT Pub. Date: Mar. 28, 2013

(65) Prior Publication Data
US 2014/0332717 A1    Nov. 13, 2014

(30) Foreign Application Priority Data

Sep. 20, 2011 (FR) ...................................... 11 02846

(51) Int. Cl.
*H01M 4/583* (2010.01)
*H01M 4/36* (2006.01)
*C01B 33/02* (2006.01)
*H01M 4/587* (2010.01)

(52) U.S. Cl.
CPC ............. *H01M 4/364* (2013.01); *C01B 33/02* (2013.01); *H01M 4/362* (2013.01); *H01M 4/587* (2013.01)

(58) Field of Classification Search
CPC ......................... H01M 4/364; C08K 2003/023
See application file for complete search history.

(56) References Cited

U.S. PATENT DOCUMENTS

| | | | | |
|---|---|---|---|---|
| 3,427,120 A * | 2/1969 | Shindo | ....................... | D01F 9/21 264/DIG. 19 |
| 4,948,573 A * | 8/1990 | Nadkarni | ................ | C01B 31/30 423/291 |
| 5,114,695 A * | 5/1992 | Jain | ...................... | C01B 21/0726 423/411 |
| 7,708,805 B2 * | 5/2010 | Heine | ....................... | D01F 9/22 423/230 |
| 2007/0032370 A1 * | 2/2007 | Weisensel | ............. | C04B 35/573 501/88 |
| 2010/0078599 A1 * | 4/2010 | Kumta | ..................... | H01B 1/24 252/502 |
| 2011/0165468 A1 | 7/2011 | Alias et al. | | |
| 2011/0311873 A1 * | 12/2011 | Schulz | .................... | C01B 31/00 429/231.8 |
| 2013/0273433 A1 * | 10/2013 | | Jouanneau-si Larbi | .................... H01M 4/133 429/231.8 |
| 2015/0118567 A1 * | 4/2015 | Chen | ...................... | B82Y 30/00 429/231.8 |

FOREIGN PATENT DOCUMENTS

| | | |
|---|---|---|
| CN | 1800094 A | 7/2006 |
| WO | WO 2010/029135 A2 | 3/2010 |

OTHER PUBLICATIONS

Wang et al. (Electrochemistry Communications 6, 2004, 689-692).*
Fan et al., "Electrospinning Preparation of Nanosilicon/Disordered Carbon Composite as Anode Materials in Li-Ion Battery", *Electrochemical and Solid-State Letters*, 2009, vol. 12, No. 10, pp. A199-A201.
Doh et al., "Synthesis of Silicon-Carbon by Polyaniline Coating and Electrochemical Properties of the Si-C/Li Cell", *Bulletin of the Korean Chemical Society*, 2006, vol. 27, No. 8, pp. 1175-1180.
Guo et al,, "Silicon/Disordered Carbon Nanocomposites for Lithium-Ion Battery Anodes", *Journal of The Electrochemical Society*, 2005, vol. 152, No. 11, pp. A2211-A2216.
Guo et al., "Optimizing synthesis of silicon/disordered carbon composites for use as anode materials in lithium-ion batteries", *Journal of Power Sources*, 2006, vol. 159, pp. 332-335.
Senkevich et al., "Thermal Transformations of Polyvinyl Alcohol as a Source for the Preparation of Carbon Materials", *Solid Fuel Chemistry*, 2007, vol. 41, No. 1, pp. 45-51.

* cited by examiner

*Primary Examiner* — Liam J Heincer
(74) *Attorney, Agent, or Firm* — Oliff PLC

(57) ABSTRACT

A method of producing a silicon/carbon composite material which includes the following successive steps: providing a silicon/polymer composite material from silicon particles and a carbonaceous polymer compound, precursor of carbon and able to be cross-linked, performing at least partial cross-linking of the polymer of the silicon/polymer composite material so as to obtain a cross-linked silicon/polymer composite material, the polymer having a cross-linking rate greater than or equal to 50% and, pyrolyzing the cross-linked silicon/polymer composite material until said silicon/carbon composite material is obtained.

17 Claims, 2 Drawing Sheets

METHOD OF PRODUCING A SILICON/CARBON COMPOSITE MATERIAL AND USE OF SUCH A MATERIAL

BACKGROUND OF THE INVENTION

The invention relates to a method of producing a silicon/carbon composite material from silicon particles and a carbonaceous polymer compound, including a pyrolysis step.

The invention also relates to the use of such a composite material.

STATE OF THE ART

Lithium batteries are being increasingly used as autonomous energy source, in particular in portable equipment. This trend is explained by the continuous improvement of the performances of lithium batteries, in particular of the mass and volume energy densities which are considerably higher than those of conventional nickel-cadmium (Ni—Cd) and metallic nickel-hydride (Ni-MH) storage batteries.

Carbon-base materials, in particular graphite, have been successfully developed and widely marketed as electrochemically active electrode materials, in particular for lithium batteries. These materials have particularly good performances on account of their lamellar structure which is favourable for lithium insertion and extraction and their stability in the course of the different charge and discharge cycles. However, the capacity of carbonaceous anodes for lithium-ion batteries has reached its theoretical value, corresponding to the $LiC_6$ composition.

Certain metals able to incorporate lithium have revealed themselves to be promising alternatives to carbon. In particular, with a theoretical capacity estimated at 3578 mAh/g (for Si→$Li_{3.75}Si$), silicon seems to be an interesting candidate for improving the performances of Li-ion battery electrodes. Nevertheless, at the present time, viable use of silicon-base electrodes is not conceivable as lithium batteries containing such electrodes present integrity problems inherent to the presence of silicon, in particular problems of volume expansion resulting in fissuring of the electrode with use.

Recently, silicon/carbon composites in which the silicon is dispersed in a carbonaceous matrix has been proposed. This active material for a lithium battery electrode would enable the integrity of the electrode to be maintained after several charge-discharge cycles.

Several methods for fabricating such silicon/carbon composites, noted Si/C, have been proposed in the literature, in particular methods implementing energy crushing and/or chemical vapor deposition (CVD) techniques. Furthermore, methods for fabricating a silicon/carbon composite have been developed in order to improve the cohesion between the silicon and carbon in the composite. Carbon does in fact enable to compensate changes of structure of the silicon particles, in particular the volume expansion of the silicon, when cycling is performed. The quality of the contact between the carbon and silicon consequently influences the strength of the Si/C composite material on cycling.

Among the documents describing preparation of silicon/carbon composite materials with the aim of remedying the shortcomings arising in the prior art, the scientific publication by Guo, Z. P., E. Milin, et al. "Silicon/Disordered Carbon Nanocomposites for Lithium-Ion Battery Anodes", Journal of The Electrochemical Society, 152(11); A2211-A2216, (2005) can be cited. Guo et al. describe production of silicon/disordered carbon nanocomposites for materials for positive and negative electrodes using PolyVinyl Alcohol (PVA) as carbonaceous precursor. The method consists in coating particles of silicon, noted Si, with PVA by mechanical crushing of a Si/PVA mixture in order to obtain a Si-PVA precursor and in then performing pyrolysis of the Si-PVA precursor in an argon atmosphere at different temperatures ranging from 600° C. to 1000° C. The Si/C composite giving the best results is obtained from 90% by weight of PVA and 10% by weight of Si and presents a reversible capacity of 800 mAh/g at the $20^{th}$ cycle. Nevertheless, Guo et al. do not make any mention of the strength of the Si—C nanocomposites obtained in this way after the $20^{th}$ cycle.

The document by Xing Fan et al. "Electrospinning preparation of nanosilicon/disordered carbon composite as anode materials in Li-ion battery", Electrochemical and Solid-State Letters (2009) 12, 10, A199-A201 describes a method for fabricating a silicon/carbon (Si/C) composite material. The Si/C material is produced by electrospinning from a solution containing polyvinylic alcohol (PVA), silicon particles and a surfactant. The Si/C composite is thus generated. It is then heated to 110° C. and pyrolysis is then performed at 500° C. After 50 cycles, the Si/C composite presents a reversible capacity of 890 mAh/g. However, the carbonaceous matrix surrounding the silicon particles seems to deteriorate progressively due to the volume expansion of the silicon.

With regard to the prior art, a requirement exists to obtain a Si/C composite material able to be used as active material for an electrode, in particular for a negative electrode, having good electrochemical performances while at the same time presenting an improved cycling resilience.

A requirement notably exists to obtain a Si/C composite material that is stable in cycling able to be used as active electrode material, in particular for a lithium battery. The composite material has for example to present a high and stable specific capacity on cycling and must not be downgraded in the course of the cycles.

OBJECT OF THE INVENTION

The object of the invention is to propose a method for fabricating a silicon/carbon composite material that is able to overcome the drawbacks of the prior art, in particular enabling a Si/C composite material to be obtained having an excellent mechanical strength when cycling operations are performed and an increased lifetime.

This object tends to be achieved by the appended claims.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
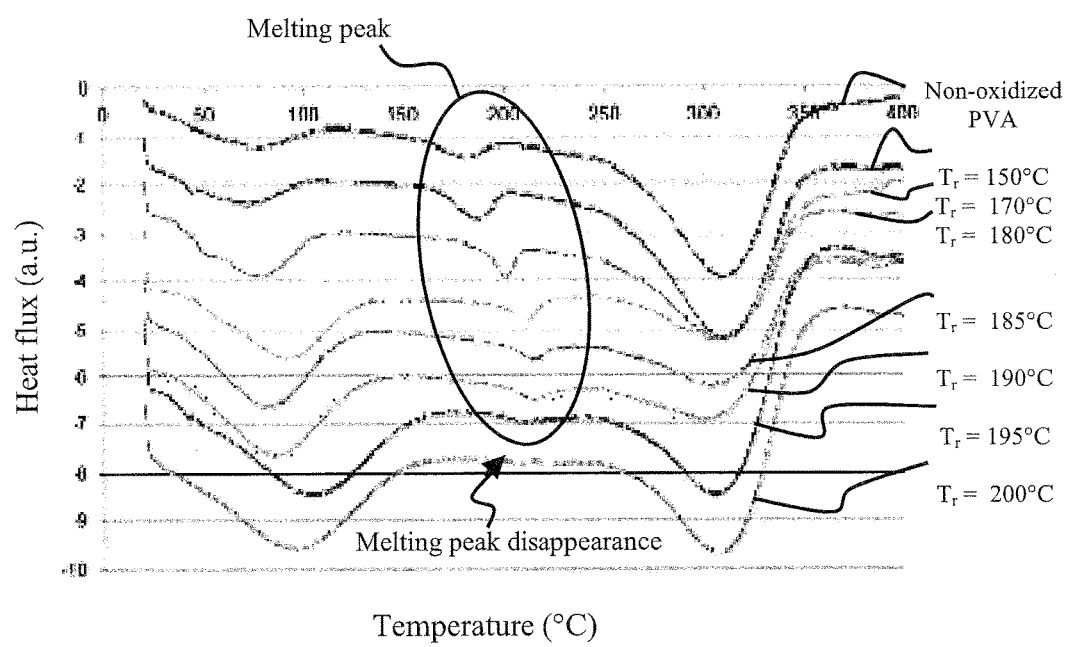
FIG. 1 represents curve plots corresponding to differential scanning calorimetry measurements of a polyvinylic alcohol at different temperatures.

A method of producing a silicon/carbon composite material comprises a step of cross-linking a silicon/polymer composite material in order to obtain a silicon/polymer composite material in which the polymer is at least partially cross-linked followed by pyrolysis of said cross-linked silicon/polymer composite material. For reasons of simplification, the abbreviation Si/C will be used for silicon/carbon in the remainder of the description.

According to a particular embodiment, the method for fabricating a Si/C composite material comprises a first step consisting in providing a silicon/polymer composite material, noted Si/polymer in the remainder of the description, formed by a material having a base formed by silicon and the polymer. The silicon-base material is for example silicon, a silicon/aluminium alloy or any other material comprising at least 50% of silicon (single-crystal, polycrystalline, amorphous).

What is meant by composite material is a heterogeneous solid material obtained by associating at least two phases the respective qualities of which complete one another to form a material with enhanced global performances.

The initial Si/polymer composite material is obtained from particles of silicon-base material and a carbonaceous polymer compound by means of any known method. Methods implementing energy crushing and/or spray drying, and/or sol-gel techniques can be cited for example purposes and in non-restrictive manner.

The Si/polymer composite material is preferably formed by silicon nuclei covered by a polymer coating.

The silicon particles are generally in the form of a powder. The silicon particles can be micrometric particles, for example the mean diameter of which for spherical silicon particles is comprised between 1 and 200 micrometers, preferably between 1 and 45 micrometers, preferably between 1 and 15 micrometers.

The silicon particles can also be nanometric particles, for example the mean diameter of which for spherical silicon particles is comprised between 5 and 1000 nanometers, preferably between 5 and 200 nanometers.

The carbonaceous polymer compound is a carbon precursor and is able to be cross-linked.

What is meant by cross-linking is formation of one or more three-dimensional lattices by creation of bonds between the macromolecular chains of the initial carbonaceous polymer compound. Cross-linking can be partial with formation of a partially three-dimensional structure.

Certain polymer compounds are known to be cross-linkable i.e. able to undergo cross-linking under particular conditions (heating, ultra-violet radiation, etc.), possibly in the presence of a hardener or a catalyst. Polymers containing a hydroxyl group, such as for example polyvinylic alcohol, noted PVA, can be cited for example purposes and in non-restrictive manner.

Carbonaceous polymer compounds comprising hydroxyl and/or cyano and/or carboxylic acid groups, and in particular chosen from the group consisting of polyvinylic alcohol (PVA), polyvinyl butyral (PVB), polyvinyl formal (PVF), and polyacrylonitrile (PAN), will preferably be chosen from the set of cross-linkable carbonaceous polymer compounds.

The Si/polymer composite material is obtained from a quantity of silicon-base material particles comprised between 50% and 1% by weight and from a quantity of the carbonaceous polymer compound comprised between 50% and 99% by weight, the sum of the quantities being equal to 100%.

The Si/polymer composite material is advantageously obtained from a quantity of particles of silicon-base material comprised between 20% and 5% by weight and a quantity of the carbonaceous polymer compound comprised between 80% and 95% by weight. The sum of the quantities of particles of silicon-base material and of carbonaceous polymer compound is equal to 100%.

The Si/polymer composite material is preferably obtained from 10% by weight of particles of silicon-base material and 90% by weight of the carbonaceous polymer compound.

After the Si/polymer composite material has been obtained, at least partial and preferably total cross-linking of the polymer present in the Si/polymer composite material is performed so as to obtain a cross-linked silicon/polymer composite material, noted cross-linked Si/polymer in the remainder of the description. What is meant by partial cross-linking is a cross-linking rate greater than or equal to 50%.

Cross-linking can conventionally be chemical, thermal (performed under the action of heat, for example with a temperature of more than 50° C.) and/or radical, for example initiated by IR, UV or electron irradiation.

Among conventional cross-linking techniques, thermal cross-linking will preferably be chosen as it is simple to implement, inexpensive and can be performed under soft conditions at the same time enabling a high rate of cross-linking to be obtained. In this respect the cross-linking method proposed by Senkevich et al., in the scientific publication "Thermal Transformations of Polyvinyl Alcohol as a Source for the Preparation of Carbon Materials", Solid fuel chemistry, 41(1):51-58, (2007), can be referred to.

Thermal cross-linking is advantageously performed in an oxidizing atmosphere, for example in air. The different modes for performing cross-linking in air will be described in the following, but the person skilled in the trade will easily be able to use the oxidizing atmosphere of his choice. Thus, unlike pyrolysis conventionally performed at high temperature and in an inert atmosphere, thermal cross-linking requires soft conditions with a low heat treatment temperature, without the necessity of an inert gas.

The cross-linking step is followed by a step of pyrolysis of the cross-linked Si/polymer composite material until said final Si/C composite material is obtained.

The object of the pyrolysis step subsequent to the cross-linking step is to achieve carbonisation of the cross-linked polymer constituting the Si/polymer composite material to transform it into carbon. Carbonisation is conventionally performed at a temperature comprised between 600° C. and 1100° C., in an inert atmosphere, for example under a nitrogen flow.

Cross-linking plays a beneficial role whatever the type of cross-linkable carbonaceous polymer compound initially used to form the Si/C composite material.

Indeed, during the temperature increase of a conventional pyrolysis step, the polymer contained in a Si/polymer composite material melts before decomposing into carbon. Creep of the polymer during pyrolysis then results in a deterioration of the morphology of the Si/polymer composite. For example purposes, when the Si/polymer composite material obtained by spray drying has a spherical initial morphology, the creep can induce a loss of coating of the polymer around the silicon or deformation of the coating formed by the polymer.

In addition, creep of the polymer in the Si/polymer composite material results in a loss of homogeneity of the composite. However, in the Si/C composite material, the absence of carbon coating around the silicon, resulting in a heterogeneity of the composite, does in fact limit the beneficial effects of the carbon.

Cross-linking enables formation of a three-dimensional lattice of the polymer resulting in hardening of the polymer, which makes it infusible. Cross-linking consequently significantly or totally reduces this creep phenomenon during the pyrolysis step.

The carbonaceous polymer compound can be cross-linked with different rates of cross-linking corresponding to the number of chains involved in the bond between the macromolecular chains of a carbonaceous polymer compound. The rate of cross-linking can be determined by any known method, for example by Fourier transform infrared spectroscopy, noted FTIR, and differential scanning calorimetry, noted DSC. Thus, depending on the degree of cross-linking, the cross-linked polymer compound will be more or less resistant to creepage.

The person skilled in the art, from the prior art and from his general knowledge in combination with the description of the present application, is able to choose the best-suited, totally or partially cross-linkable, carbonaceous polymer compound so as to reduce creep during the pyrolysis step. Furthermore, the person skilled in the art is also able to determine the suitable cross-linking method according to the choice of the initial carbonaceous polymer compound and the conditions of performing cross-linking of said polymer compound.

The cross-linking step prior to pyrolysis enhances the cycling resilience of the Si/C composite materials prepared from a carbonaceous precursor polymer compound.

According to a preferred particular embodiment, the carbonaceous polymer compound is advantageously polyvinylic alcohol (PVA).

The initial Si/polymer composite material is preferably obtained by crushing a mixture of silicon particles and PVA. Alternatively, lyophilisation or spray drying are also choice preparation methods.

To obtain the cross-linked Si/PVA composite material, cross-linking is advantageously performed by oxidation in air at a temperature comprised between 150° C. and 210° C. In particular, cross-linking is performed by oxidation in air at a temperature equal to 200° C.±10° C., i.e. between 190° C. and 210° C. Oxidation in air lasts for at least 10 hours, preferably between 10 hours and 20 hours, so as to obtain cross-linking of the polymer while limiting its deformation linked to the temperature increase.

Measurements by DSC of the cross-linked PVA at different temperatures were made and are represented in FIG. 1. To do this, the PVA was cross-linked at cross-linking temperatures, noted $T_r$, varying between 150° C. and 200° C., in a muffle furnace by means of the following heat treatment:
- a temperature increase at a rate of 10° C./min up to the chosen temperature $T_r$,
- a plateau at the temperature $T_r$ during 16 h and,
- a temperature decrease to ambient temperature (about 20° C.) at a rate of 10° C./min.

As represented in FIG. 1, a melting peak of the PVA is identified between 150° C. and 220° C. The increase of the temperature $T_r$ increases the rate of cross-linking of the PVA and therefore the melting limit of the PVA. An effective disappearance of the melting peak of the PVA is in fact observed for oxidation of the PVA at 200° C. (see arrow in FIG. 1). This study enables the efficient temperature $T_r$ for the cross-linking step to be determined and justifies selection of the temperature of $T_r$ at 200° C. specific to PVA.

This study can be generalised to determine the specific thermal cross-linking temperature according to the cross-linkable polymer compound chosen in the fabrication method according to the invention, avoiding creep of this carbonaceous polymer compound within the Si/polymer composite material before pyrolysis.

After cross-linking, the cross-linked Si/PVA composite material undergoes pyrolysis at a temperature comprised between 600° C. and 1100° C., in an inert atmosphere, for example in a nitrogen flow.

According to a variant, the initial Si/polymer composite material is preferably obtained by spray drying of a dispersion of silicon particles in a PVA solution. The spray drying operation is an operation commonly used in particular in the pharmaceutics and agri-food field. This operation enables the silicon particles to be encapsulated by the PVA. This spray drying operation consists in spraying a suspension in fine droplets through a nozzle in order to obtain a powder after passing in the atomizer under a heat flux. On completion of spraying, the collected powder is formed by silicon particles coated with PVA. Spray drying is performed by means of an atomizer and enables a Si/C composite material in the form of essentially spherical particles to be obtained.

The Si/carbon composite material obtained by means of the fabrication method described in the foregoing presents electrochemically improved properties and can be used as active material of an electrode. What is meant by active material of an electrode is a material participating in the electrochemical reactions involved within the electrode.

In particular, an electrode comprising the Si/carbon composite material obtained from the fabrication method according to the invention is particularly suitable for use in a lithium battery.

According to a particular embodiment, a lithium battery comprises an electrode containing the Si/C composite material described above and a lithium ion source electrode.

The electrode containing the Si/C composite material can be composed of a dispersion formed according to any known method by the Si/C composite obtained from a fabrication method described in the foregoing and preferably having undergone recrushing, and a conductive additive, for example a conductive carbon, and possibly a binder designed to ensure a mechanical cohesion once the solvent has evaporated.

The binder is conventionally a polymer binder chosen from polyesters, polyethers, polymer derivatives of methyl methacrylate, acrylonitrile, carboxy methyl cellulose and its derivatives, rubbers of butadiene styrene type and their derivatives, polyvinyl acetates or polyacrylic acetate and vinylidene fluoride polymers, for example polyvinylidene difluoride (noted PVdF).

The lithium battery advantageously comprises a non-aqueous electrolyte. In known manner, the non-aqueous electrolyte can for example be formed by a lithium salt comprising at least one $Li^+$ cation, chosen from:
lithium bis[(trifluoromethyl)sulfonyl]imide (LiN$(CF_3SO_2)_2$), lithium trifluoromethane sulfonate (LiCF$_3$SO$_3$), lithium bis(oxalato)borate (LiBOB), lithium bis(perfluoroethylsulfonyl)imide (LiN(CF$_3$CF$_2$SO$_2)_2$),
compounds of LiClO$_4$, LiAsF$_6$, LiPF$_6$, LiBF$_4$, LiI, LiCH$_3$SO$_3$ or LiB(C$_2$O$_4)_2$ formula and,
fluorinated compounds of LiR$_F$SO$_3$R$_F$, LiN(R$_F$SO$_2)_2$ or LiC(R$_F$SO$_2)_3$ formula where R$_F$ is a group chosen from a fluorine atom and a perfluoroalkyl group comprising between one and eight carbon atoms.

The lithium salt is preferably dissolved in a solvent or a mixture of aprotic polar solvents, for example chosen from ethylene carbonate (noted "EC"), propylene carbonate, dimethyl carbonate, diethyl carbonate (noted "DEC"), and methyl ethyl carbonate.

EXAMPLES

Characteristics of the Initial Compounds

Silicon in the form of spherical particles having a mean diameter comprised between 100 nm and 200 nm, marketed by S'tile.

polyvinylic alcohol (PVA), hydrolysed at 80% molar, having a molar mass of 6000 g·mol.$^{-1}$ and marketed by Polyscience.

Example 1

Synthesis of a Si10/C90 Composite Material

A Si/PVA composite material is obtained by dry crushing, in air, of a mixture of 10% by weight of silicon particles and 90% by weight of PVA. To do this, 0.8 g of silicon particles and 7.2 g of PVA are thoroughly mixed in a Retsch PM100 centrifugal mill by means of a 250 ml steel bowl with 210 g of steel balls with a diameter of 20 mm. The duration of the crushing is 10 h with a speed of 500 r.p.m.

The Si/PVA composite material obtained is equally divided into six alumina crucibles of 10 mL and placed in a muffle furnace. In order to cross-link the PVA, the following heat treatment is applied in air:
a temperature increase to 200° C. at a rate of 10°/min,
a temperature plateau at 200° C. for 16 h and,
a temperature decrease to a temperature of 20° C. at a rate of 10° C./min.

On completion of this protocol, a cross-linked Si/PVA composite material powder is obtained in which the PVA is more than 80% cross-linked, ideally 100% cross-linked.

Finally, the cross-linked Si/PVA composite material powder is pyrolysed in a quartz tube in a nitrogen atmosphere with a flowrate of 100 ml/min. Pyrolysis is then applied with the following heat treatment:
a temperature increase to 1050° C. at a rate of 10°/min,
a temperature plateau at 1050° C. for 3 h and
a temperature decrease to a temperature of 20° C. at a rate of 10° C./min.

On completion of this step, the Si/C composite material, referenced Si10/C90, is characterized by Instrumental Gas Analysis (IGA). The results obtained show that the Si/C composite material is formed by 44% by weight of silicon and 56% by weight of carbon.

Preparation of a Lithium Battery of B10/90 "Button Cell" Type

A lithium battery of B10/90 "button cell" type was produced by means of a conventional method from the Si10/C90 composite material.

In particular, the lithium battery comprises a positive electrode containing the Si10/C90 composite, a negative electrode made from lithium and a separator of Celgard type made from polymer.

The positive electrode is fabricated by thorough mixing of 80% by weight of Si10/C90 material acting as electrochemically active material, 10% by weight of carbon black as conductive additive and 10% by weight of polyvinylidene hexafluoride as binder. The mixture obtained is then deposited on a copper current collector.

The negative electrode is formed by a circular film with a diameter of 14 mm and a thickness of 200 µm deposited on a copper strip acting as current collector. The separator is imbibed with a LiPF6-base liquid electrolyte at a concentration of 1 mol·L$^{-1}$ in a EC/DEC mixture in a 1/1 solvent volume.

Comparative Example 1'

Synthesis of a c-Si10/C90 Composite Material and a $B_c$10/90 Lithium Battery

For comparative purposes, a c-Si10/C90 composite material was obtained using an operating mode strictly identical to that of example 1 with the exception that the Si/PVA composite material does not undergo cross-linking before pyrolysis. The results of the IGA show that the c-Si10/C90 composite material is formed by 77% by weight of silicon and 23% by weight of carbon.

A lithium battery of "button cell" type, noted $B_c$10/90, comprising the c-Si10/C90 composite material was produced by means of an operating mode identical to that of example 1.

The two lithium batteries B10/90 and $B_c$10/90 were then tested at a temperature of 20° C., in galvanostatic mode, under C/20 conditions in a voltage window comprised between 1.2V and 0.01V vs. Li$^+$/Li.

Figure 2:
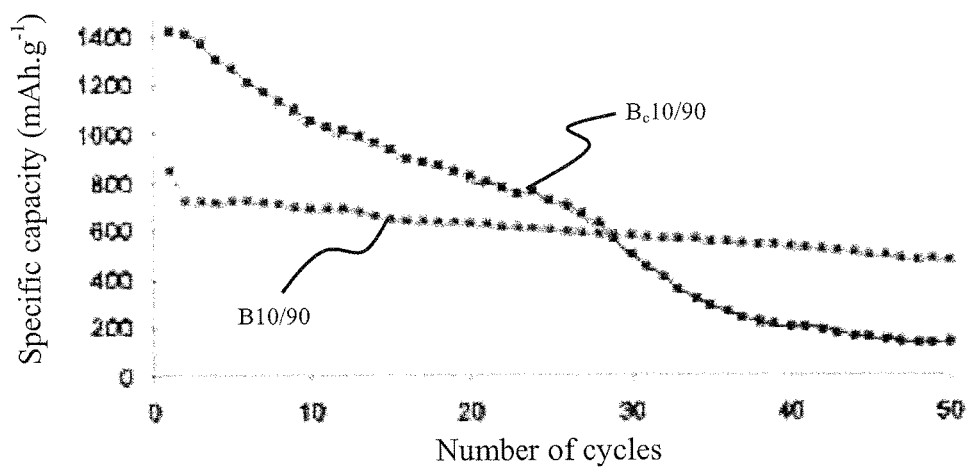
FIG. 2 represents two plots of cycling at a temperature of 20° C., in galvanostatic mode, of a B10/90 button cell according to a particular embodiment of the invention, as compared with a $B_c10/90$ button cell of the prior art.

The galvanostatic cycling plots obtained are represented in FIG. 2. FIG. 2 shows a drastic drop of the specific capacity of the $B_c$10/90 battery after the 25$^{th}$ cycle. The electrochemical performances of the B10/90 battery on the other hand are maintained at a specific capacity value of more than 500 mAh/g after the 20th cycle, without any drop in performance.

Example 2

Synthesis of a Si10/C90-2 Composite Material and a B10/90-2 Lithium Battery

Synthesis of a Si10/C90-2 composite is performed by spray drying. In particular, 7.2 g of PVA are dissolved in 100 ml of deionized water at 60° C. under vigorous stirring for 20 min by means of a magnetic stirrer. On completion of this step, the polymer is completely dissolved and 0.8 g of silicon is added to the solution to obtain a suspension which will be stirred for 20 min. The suspension is then nebulized in a B-290 atomizer marketed by BUCHI, in hot air at 140° C.

The Si/PVA composite material is then cross-linked with an identical protocol to that of example 1.

Finally, the cross-linked Si/PVA composite material obtained is pyrolysed in a quartz tube in a nitrogen atmosphere with a flowrate of 200 ml/min. Pyrolysis is then applied with the following heat treatment:
a temperature increase to 850° C. at a rate of 10°/min,
a temperature plateau at 850° C. for 3 h and
a temperature decrease to a temperature of 20° C. at a rate of 10° C./min.

The results of the IGA show that the Si10/C90-2 composite material is formed by 44% by weight of silicon and 56% by weight of carbon.

A lithium battery of "button cell" type, noted B10/90-2, comprising the Si10/C90-2 composite material was produced with an operating mode identical to that of example 1.

Comparative Example 2'

Synthesis of a c-Si10/C90-2 Composite Material and a $B_c10/90$-2 Lithium Battery For comparison purposes, a c-Si10/C90-2 composite material was obtained with a strictly identical operating mode to that of example 2 with the exception that the Si/PVA composite material does not undergo cross-linking before pyrolysis. The results of the IGA show that the c-Si10/C90-2 composite material is formed by 77% by weight of silicon and 23% by weight of carbon.

A lithium battery of "button cell" type, noted $B_c10/90$-2, comprising the c-Si10/C90-2 composite material was produced with an identical operating mode to that of example 2.

The two lithium batteries B10/90-2 and $B_c10/90$-2 were tested at a temperature of 20° C., in galvanostatic mode, under C/20 conditions in a voltage window comprised between 1.2V and 0.01V vs. Li$^+$/Li.

Figure 3:
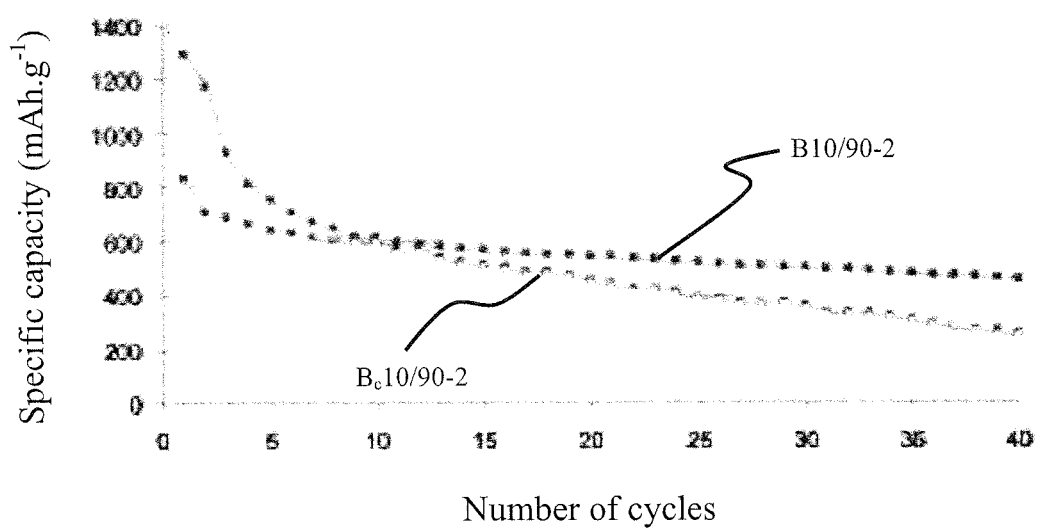
FIG. 3 represents two plots of cycling at a temperature of 20° C., in galvanostatic mode, of a B10/90-2 button cell according to another particular embodiment of the invention, as compared with a $B_c10/90$ button cell of the prior art.

The galvanostatic cycling plots obtained are represented in FIG. 3. As for example 1, FIG. 3 shows a drastic drop of the specific capacity of the $B_c10/90$-2 battery after the 25$^{th}$ cycle unlike the B10/90-2 battery which maintains a specific capacity value of more than 500 mAh/g after the 20th cycle, without any drop in performance.

These results illustrate the beneficial effect of the cross-linking step before pyrolysis on the cycling resilience of the Si/C composite material. Cross-linking of the PVA enables the quantity of carbon in the Si/C composite material to be significantly increased as compared with a PVA that is not cross-linked. The silicon particles are covered by a thicker and more uniform carbon layer which prevents loss of electric contact with the rest of the electrode and is able to absorb the repeated volume changes of the silicon when lithium insertion and extraction take place.

The fabrication method according to the invention is remarkable in that it is easy to implement and inexpensive. The fabrication method provides a Si/C composite material that has improved electrochemical properties and is stable in cycling. The fabrication method enables the quality of the carbon coating around the silicon in the Si/C composite material to be improved and increases the lifetime of an electrode for a lithium battery containing such a material. In particular, the Si/C composite material obtained by the method presents a high carbon content and an excellent cohesion between the silicon and carbon, making it particularly efficient as electrochemically active material of an electrode, in particular for a lithium battery.

The invention claimed is:

1. A method of producing a silicon/carbon composite material comprising the following successive steps:
   providing a silicon/polymer composite material from silicon particles covered with a carbonaceous polymer compound, which compound is a precursor of carbon and able to be cross-linked,
   performing at least partial cross-linking of the polymer of the silicon/polymer composite material so as to obtain a cross-linked silicon/polymer composite material and avoid creep of the polymer of the silicon/polymer composite material, the polymer having a cross-linking rate greater than or equal to 50%, and
   pyrolysing the cross-linked silicon/polymer composite material while avoiding creep until said silicon/carbon composite material is obtained,
   wherein the carbonaceous polymer compound is chosen from the group consisting of polyvinylic alcohol (PVA), polyvinyl butyral (PVB), polyvinyl formal (PVF), and polyacrylonitrile (PAN).

2. The method according to claim 1, wherein cross-linking is thermal.

3. The method according to claim 2, wherein the thermal cross-linking is performed in an oxidising atmosphere.

4. The method according to claim 1, wherein the carbonaceous polymer compound comprises hydroxyl, cyano and/or carboxylic acid groups.

5. The method according to claim 1, wherein the carbonaceous polymer compound is polyvinylic alcohol (PVA).

6. The method according to claim 5, wherein cross-linking is performed by oxidation in air at a temperature comprised between 150° C. and 210° C.

7. The method according to claim 6, wherein cross-linking is performed by oxidation in air at a temperature equal to 200° C.±10° C.

8. The method according to claim 1, wherein the silicon/polymer composite material is obtained from a quantity of silicon particles comprised between 50% and 1% by weight and a quantity of the carbonaceous polymer compound comprised between 50% and 99% by weight, the sum of the quantities being equal to 100%.

9. The method according to claim 1, wherein the silicon/polymer composite material is obtained from 10% by weight of silicon particles and 90% by weight of the carbonaceous polymer compound.

10. The method according to claim 1, wherein the cross-linking rate is more than 80%.

11. The method according to claim 1, wherein the cross-linking rate is 100%.

12. The method according to claim 1, wherein the silicon/carbon composite material is formed by lyophilisation or spray drying.

13. The method according to claim 1, which additionally comprises fabricating an electrode from the silicon/carbon composite material as an active material thereof.

14. The method according to claim 13, wherein the fabricating additionally comprises including a binder in the electrode.

15. An electrode comprising a silicon/carbon composite material able to be obtained by the method of producing according to claim 1.

16. A lithium battery comprising at least one electrode according to claim 15.

17. A method of producing a silicon/carbon composite material comprising the following successive steps:
   providing a silicon/polymer composite material from silicon particles covered with a carbonaceous polymer compound, which compound is a precursor of carbon and able to be cross-linked,
   performing at least partial cross-linking of the polymer of the silicon/polymer composite material so as to obtain a cross-linked silicon/polymer composite material and reduce creep of the polymer of the silicon/polymer composite material, the polymer having a cross-linking rate greater than or equal to 50%, and
   pyrolysing the cross-linked silicon/polymer composite material until said silicon/carbon composite material is obtained,
   wherein the carbonaceous polymer compound is chosen from the group consisting of polyvinylic alcohol (PVA), polyvinyl butyral (PVB), polyvinyl formal (PVF), and polyacrylonitrile (PAN), wherein the silicon particles have a mean diameter between 1 and 200 µm.

* * * * *